G. F. Marshall,
Horse Collar,
No. 45,060. Patented Nov. 15, 1864.

Witnesses.
Henry Morris
C. L. Topliff

Inventor
Geo. F. Marshall
per Munn & Co.
attorneys

UNITED STATES PATENT OFFICE.

GEORGE F. MARSHALL, OF CLEVELAND, OHIO.

IMPROVEMENT IN HORSE-COLLARS.

Specification forming part of Letters Patent No. 45,060, dated November 15, 1864.

*To all whom it may concern:*

Be it known that I, GEORGE F. MARSHALL, of Cleveland, in the county of Cuyahogo and State of Ohio, have invented a new and useful Improvement in Horse-Collars; and I do hereby declare that the following is a full, clear, and exact description thereof, which will enable others skilled in the art to make and use the same, reference being had to the accompanying drawings, forming part of this specification, in which—

Figure 1:
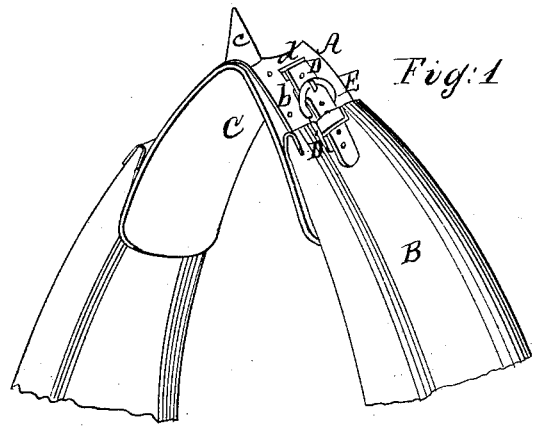
Figure 2:
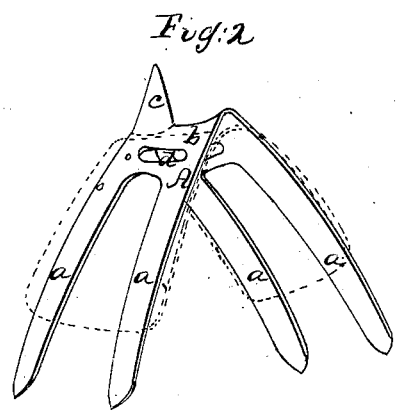

Figure 1 is a perspective view of the upper part of a horse-collar with my improvement applied to it; Fig. 2, a perspective view of the invention detached from the horse-collar.

Similar letters of reference indicate like parts.

This invention consists in the employment or use of a metallic tree or frame with chafing leather or pads attached, and applied to the top or upper part of a horse-collar in such a manner as to effectually prevent the hame-straps from galling the horse's neck or wearing the mane, and also prevent the hames slipping over the rim of the collar at the top, and at the same time be capable of being adjusted so that the collar may be varied in dimensions to suit the neck of a horse.

A represents my improvement, which may be constructed of wrought or malleable cast iron; the latter material will probably be most generally used. The tree or frame has four arms, *a a a a*, two at each side, which extend downward from the upper main part *b* in an oblique direction, the arms at one side being at an angle of about ninety degrees with those at the other side, as shown clearly in Fig. 2.

The upper part, *b*, of the tree or frame is curved similarly to a saddle tree, and at its front end there is a vertical point, *c*, at the front part of *b*, or a check-rein hook may be employed in its stead. The arms *a* of the tree or frame A are inserted in the upper part of the horse-collar B, and allowed to slide freely up and down therein.

C represents a chafing-leather, which is at the under side of the tree or frame A, and D is a strap which is attached to the upper part of the collar B at one end and passes through slots *d* in the part *b* of the tree or frame A, and is connected to a strap, D', on the other part of the collar, by means of a buckle, E, the strap D also passing through a slot in the chafing-leather C. By means of these straps the tree or frame and chafing-leather are secured to the collar. By this arrangement the hame-straps, which buckle over the top of the tree or frame A, are effectually prevented from galling the horse or wearing the mane, while the point *c* prevents the hames slipping over the rim *e* of the collar. The tree or frame also has the tendency to bring the pressure on the sides of the neck instead of at the top, avoiding as much as possible the lateral friction by adjusting the tree or frame higher or lower by means of the straps D D', whereby the collar is made to fit the neck of the animal.

This invention is more especially designed for the padded or open-hame collar when used with low hames, but is applicable to the long straw or scotch collar.

The tree or frame admits of a space above the horse's neck, so that the top of the neck is relieved from downward pressure.

I claim as new and desire to secure by Letters Patent—

1. The metallic tree or frame A, constructed and applied to the horse-collar B, substantially as and for the purpose herein set forth.

2. In combination with the tree or frame A, the chafing-leather C, point *c*, or check-hook, either or both, on the part *b* of the tree or frame, and the straps D D', all arranged and applied to the horse collar, substantially as herein described.

GEO. F. MARSHALL.

Witnesses:
 WELLS PORTER,
 GEO. N. BAKER.